(12) United States Patent
Sip

(10) Patent No.: US 8,120,317 B2
(45) Date of Patent: Feb. 21, 2012

(54) WIRELESS CHARGER AND WIRELESS CHARGING METHOD THEREOF

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 429 days.

(21) Appl. No.: 12/541,177

(22) Filed: Aug. 14, 2009

(65) Prior Publication Data
US 2010/0259215 A1 Oct. 14, 2010

(30) Foreign Application Priority Data
Apr. 9, 2009 (CN) .......................... 2009 1 0301449

(51) Int. Cl.
*H02J 7/00* (2006.01)
(52) U.S. Cl. .......................... 320/108; 307/104; 320/114
(58) Field of Classification Search .................. 320/108, 320/114
See application file for complete search history.

(56) References Cited

U.S. PATENT DOCUMENTS

| | | | |
|---|---|---|---|
| 6,906,495 B2 * | 6/2005 | Cheng et al. | 320/108 |
| 7,026,789 B2 * | 4/2006 | Bozzone et al. | 320/108 |
| 7,414,380 B2 * | 8/2008 | Tang et al. | 320/108 |
| 7,683,572 B2 * | 3/2010 | Toya | 320/108 |
| 8,013,568 B2 * | 9/2011 | Park et al. | 320/108 |
| 2009/0153098 A1 * | 6/2009 | Toya et al. | 320/108 |

* cited by examiner

*Primary Examiner* — Ramy Ramadan
(74) *Attorney, Agent, or Firm* — Altis Law Group, Inc.

(57) ABSTRACT

A wireless charger for charging an electronic device includes a holder with a primary coil and a number of holding coils fixed thereon and a resilient member sleeved thereon. The wireless charger further includes a sensing module, a storing module, a comparing module and an adjusting module. The sensing module detects each current value of the holding coils when the wireless charger is powered on. The storing module stores each current value of the holding coils from the sensing module and predetermines a reference current value for each holding coil. The comparing module compares the current value with the reference current value to determine whether the current value equals to the reference current value. The adjusting module changes the current values to the reference current values when the current value is not equal to the reference current value to adjust an angle of the secondary coil relative to the primary coil.

14 Claims, 6 Drawing Sheets

WIRELESS CHARGER AND WIRELESS CHARGING METHOD THEREOF

BACKGROUND

1. Technical Field

The present disclosure relates to wireless chargers and a wireless charging method thereof.

2. Description of Related Art

Generally, a normal wireless charging method provides a coil formed in the wireless charger, while a corresponding electromagnetic coil is provided in the electronic device. The two coils charge each other via electromagnetic induction. In this wireless charging method, the two coils must be positioned in parallel with a minimum distance for maximum efficiency. However, because of design constraints, the charging surface of the electronic device may be positioned at an angle with respect to the surface of the charging device. Thus, it will lower the charging efficiency of the charger.

Therefore, it is desirable to provide a wireless charger and a wireless charging method thereof, which can overcome or at least alleviate the above-mentioned problems.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
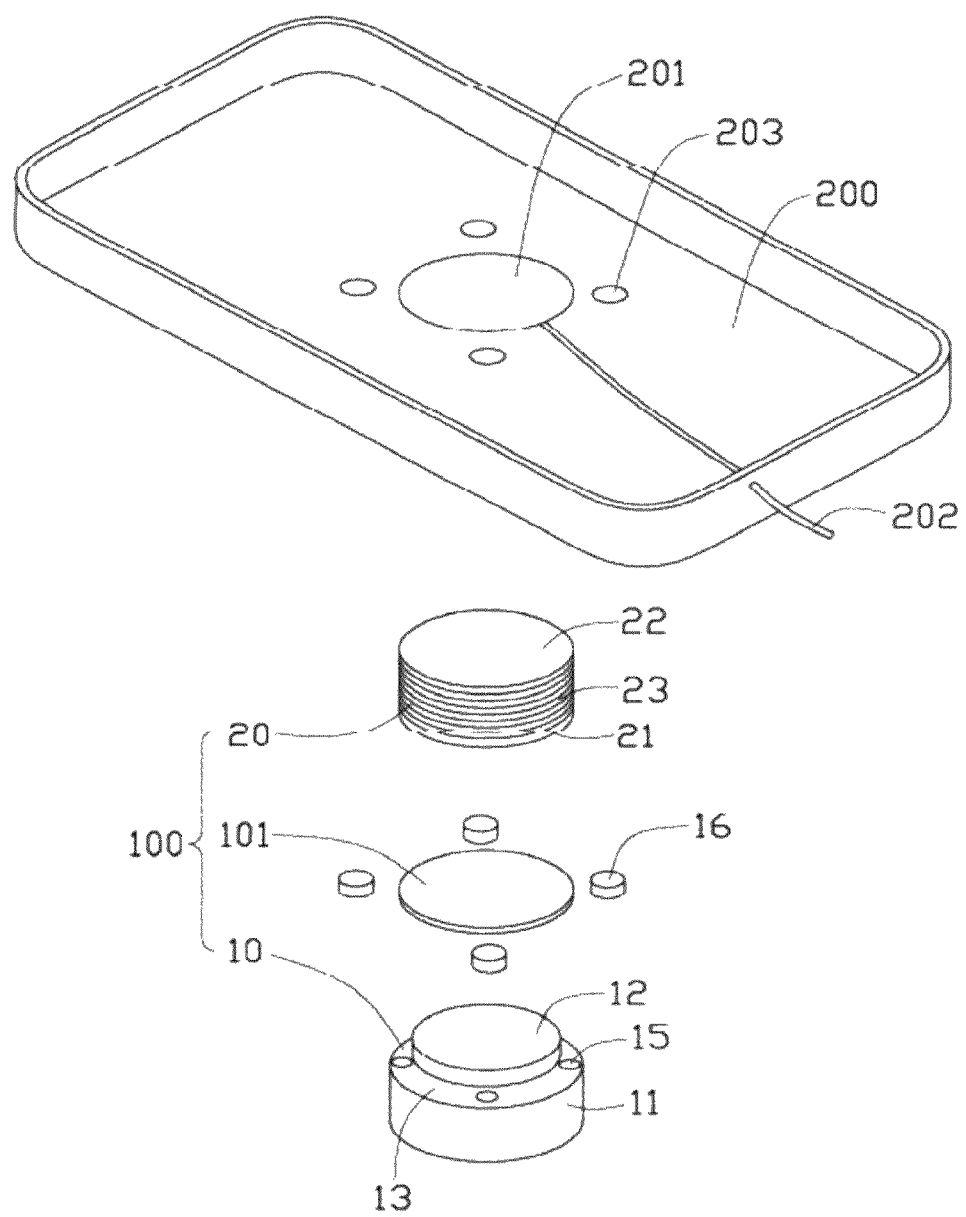
FIG. 1 is an isometric, exploded view of a wireless charger, according to an exemplary embodiment.

Referring to FIG. 1, a wireless charger 100 for charging an electronic device 200 by electromagnetic induction is shown. The wireless charger 100 includes a primary coil 101. The electronic device 200 includes a secondary coil 201 electromagnetic coupled to the primary coil 101 when charged by the wireless charger 100, and a number of metal blocks 203 surrounding the secondary coil 201.

The wireless charger 100 includes a holder 10 and a resilient member 20. The holder 10 is cylindrically shaped. The holder 10 includes a base 11 and a convex platform 12 formed on an upper surface of the base 11. The base 11 defines a receiving cavity 13 (shown in FIG. 4). The primary coil 101 is fixed on the top surface of the convex platform 12 facing the resilient member 20.

The diameter of the convex platform 12 is smaller than that of the base 11, thus a step 14 is formed between the convex platform 12 and the base 11. The step 14 defines four holes 15. Four holding coils 16 are received in the holes 15 around the convex platform 12 correspondingly.

The resilient member 20 is also cylindrically shaped and includes an end surface 22 away from the holder 10 and a side surface 23 perpendicularly connecting the end surface 22. The resilient member 20 is made of elastic material and forms a number of resilient threads 21 on the side surface 23. The diameter of the resilient member 20 is substantially the same as that of the base 11 so that the resilient member 20 can be sleeved and fixed on the base 11 by friction. The distance between the end surface 22 of the resilient member 20 and the upper surface 13 of the base 11 is larger than the height of the holding coils 16 relative to the upper surface 13 of the base 11, so that the resilient member 20 can be compressed towards the holder 10.

Figure 2:
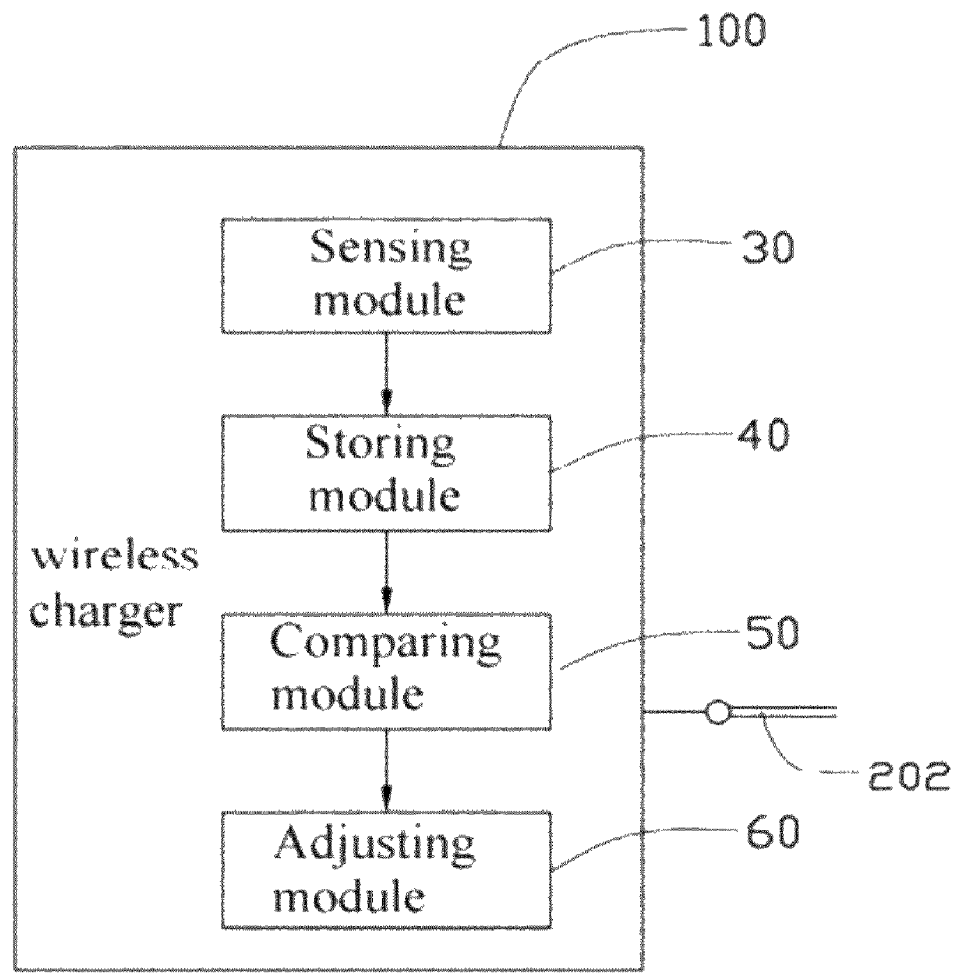
FIG. 2 is a functional block diagram of the wireless charger of FIG. 1.
Figure 3:
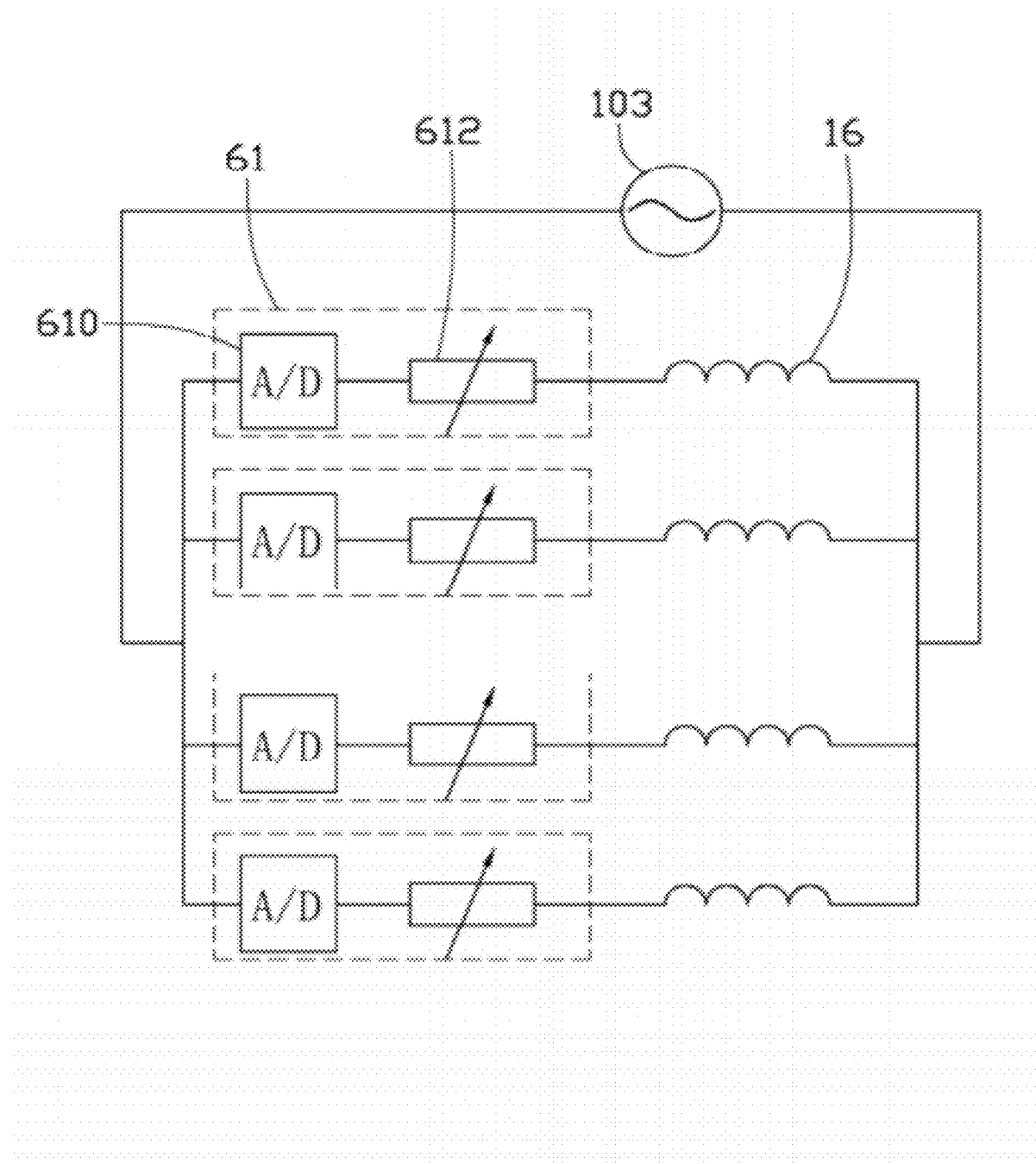
FIG. 3 is a circuit diagram of the wireless charger of FIG. 1.

Referring to FIGS. 2-3, in order to be auto-adjustable, the wireless charger 100 further includes a sensing module 30, a storing module 40, a comparing module 50, and an adjusting module 60. In this embodiment, each of the sensing module 30, the storing module 40, the comparing module 50, and the adjusting module 60 is controlled by a micro-processor (not shown).

The wireless charger 100 is connected to an alternating current value (AC) power supply 103 and each holding coil 16 is supplied with power by the AC power supply 103. When the wireless charger 100 is power on, each holding coil 16 generates a current value. The sensing module 30 is configured for detecting the current value in the holding coils 16. In this embodiment, the sensing module 30 includes four current value sensors corresponding to the holding coils 16. When the holding coils 16 approaches the corresponding metal blocks 203, an attraction force between the holding coils 16 and the metal blocks 203 is produced. In this embodiment, the attraction force is directly proportion to the current value.

The storing module 40 is connected to the sensing module 30 to read each current value of the holding coils 16. A reference current value is predetermined for each holding coil 16. In this embodiment, the reference current value is recorded by the storing module 40 when the primary coil 101 coaxially faces the secondary coil 201. The storing module 40 further stores a number of product models for a number of electronic devices 200. Each of the product models has a reference current value. Therefore, when the wireless charger 100 charges the electronic device 200, the wireless charger 100 only needs to read the product model to obtain the predetermined reference current value of the electronic device 200. In this embodiment, the electronic device 200 connects to the wireless charger 100 via a data line 202 for transmitting and receiving a data therebetween.

The comparing module 50 is configured for comparing the current value with the reference current value to determine whether the current value equals the reference current value. If the current value equals the reference current value, the wireless charger 100 continues charging the electronic device 200, and the comparing module 50 does not signal the adjusting module 60 to initiate a connection to the comparing module 40. If the current value does not equal the reference current value, the comparing module 50 invokes the adjusting module 60.

The adjusting module 60 is configured for changing the current values of the holding coils 16 to the reference current values according to the comparison result of the comparing module 50, as a result the attraction force between the holding coils 16 and the metal blocks 203 is also changed. The adjusting module 60 includes a number of adjusting circuits 61 connecting to the corresponding holding coils 16 for adjusting the current value of the holding coils 16 to the reference current value. In this embodiment, the adjusting circuits 61 are received in the receiving cavity 13 of the holder 10 and connected to the holding coils 16 through the holes 15 of the holder 10.

Each adjusting circuit 61 connects to the AC power supply 103 and includes an alternating current value/direct current value (A/D) unit 610 and a variable resistance 612 connected to each other in series. The A/D unit 610 is configured for transforming an alternating current value of the holding coil 16 to obtain a direct current value and attract the metal blocks 203. The variable resistance 612 is configured for changing the current value of the holding coil 16 by changing the resistance of the adjusting circuit 61.

Before charging, the electronic device 200 is first positioned on the end surface 22 of the resilient member 20 with the secondary coil 201 aligned with the primary coil 101. The holding coils 16 correspondingly attract the metal blocks 203 of the electronic device 200.

Figure 4:
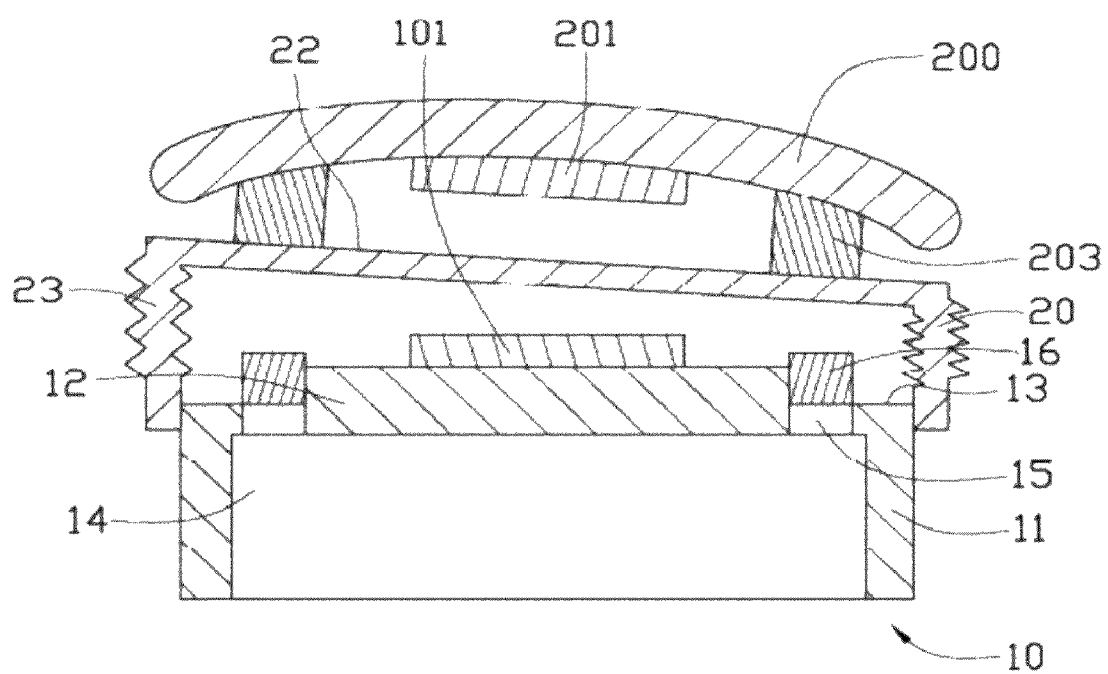
FIG. 4 is a schematic, cross-sectional view of the wireless charger of FIG. 1, together with an electronic device, showing the wireless charger on an un-adjusted state.

Referring to FIG. 4, when the wireless charger 100 charges the electronic device 200 having a curved surface, the secondary coil 201 of the electronic device 200 is not parallel to the primary coil 101 and does not coaxially face the primary coil 101.

When the wireless charger 100 is power on, the sensing module 30 detects the current value in each holding coil 16. Then the comparing module 50 compares the current value with the reference current value, if the current value is equal to the reference current value, the adjusting module 60 adjusts the current value to the reference current value. When the current value changes, according to the resistance of the variable resistance 612 changing, then the attraction force between the holding coil 16 and the corresponding metal block 203 is also changed, so that the resilient member 20 deforms resiliently to adjust the angle of the secondary coil 201 of the electronic device 200 relative to the primary coil 101 of the wireless charger 100. Thus, the electronic devices 200 can be adjusted to face the wireless charger 100 coaxially. Therefore, the wireless charger 100 can charge the device at a higher charging efficiency after adjustment.

Figure 5:
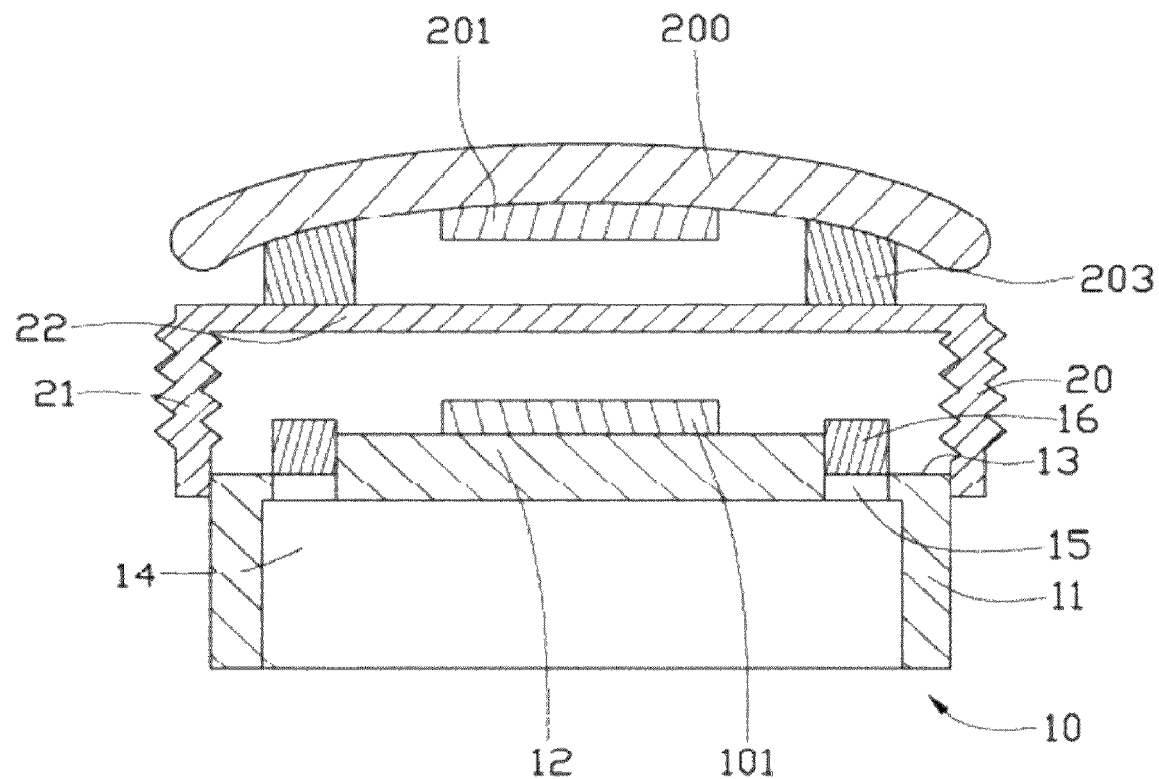
FIG. 5 is similar to FIG. 4, but showing the wireless charger on an adjusted state.

Referring to FIG. 5, when the electronic device 200 is coaxially contacted with the wireless charger 100 for charging, the primary coil 101 is electromagnetic coupled to the secondary coil 201 and the wireless charger 100 charges the electronic device 200 with high charging efficiency.

Figure 6:
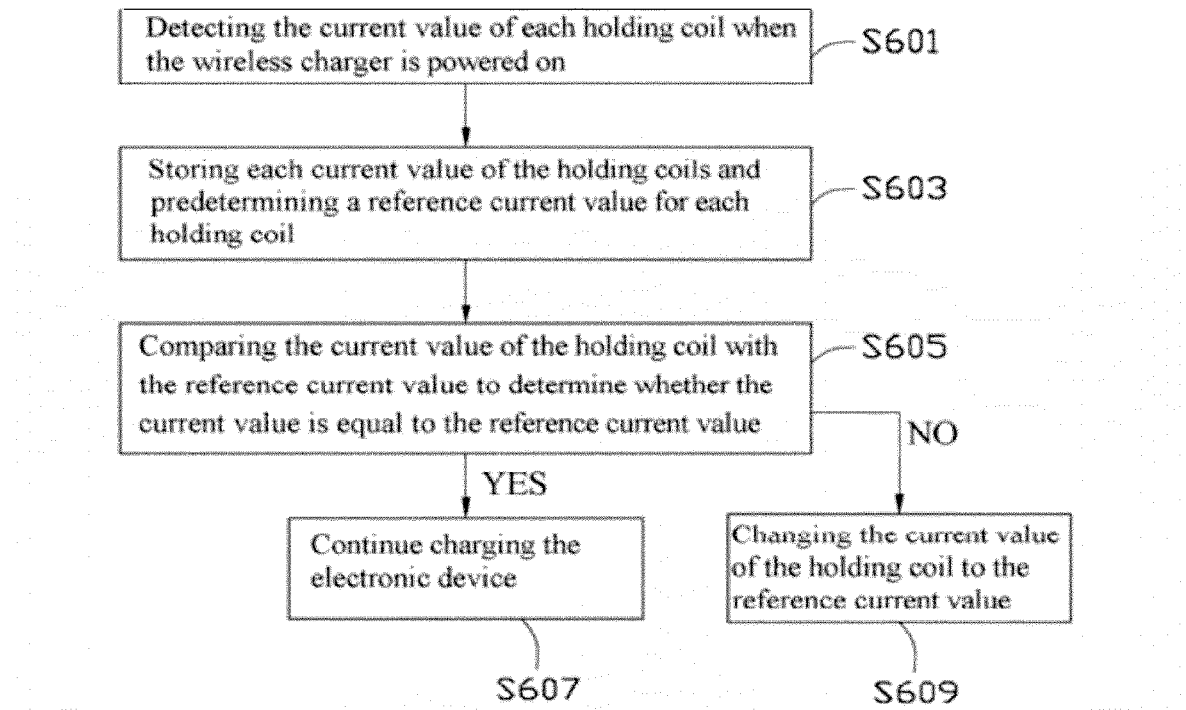
FIG. 6 is a flowing chart of an charging method of the wireless charger of FIG. 1.

Referring to FIG. 6, an charging method for the wireless charger 100 includes the following steps.

In step S601, the current values of the holding coils 16 are detected. In this embodiment, the wireless charger 100 is connected to an alternating current value (AC) power supply 103 and each holding coil 16 is supplied with power by the AC power supply 103. When the wireless charger 100 is powered on, each holding coil 16 generates current. In this embodiment, the wireless charger 100 includes four current value sensors corresponding to the holding coils 16 to detect the current value of the holding coils 16.

In step S603, each current value of the holding coils 16 is stored and the reference current value for each holding coil 16 is predetermined. In this embodiment, the reference current value is recorded when the primary coil 101 coaxially faces the secondary coil 201. In this step, the wireless charger 100 further prestores the product models for the electronic devices 200. Each product model corresponds to the reference current value of the electronic device 200. Therefore, when the wireless charger 100 charges the electronic device 200, the wireless charger 100 only needs to read the product model to obtain the predetermined reference current value of the electronic device 200.

In step S605, the wireless charger 100 compares the current value of the holding coil 16 with the reference current value to determine whether the current value of the holding coil 16 is equal to the reference current value. If the current value equals the reference current value, the step S605 will be changed to step S607: continue charging the electronic device 200. If the current value of the holding coil 16 is not equal to the reference current value, the step S605 will be changed to step S609 described below.

When the holding coils 16 are powered on and approaches to the corresponding metal blocks 203, an attraction force between the holding coils 16 and the metal blocks 203 is produced. In this embodiment, the attraction force is directly proportion to the current value.

In step S609, the wireless charger 100 changes the current value of the holding coil 16 to the reference current value to change the attraction force between the holding coils 16 and the metal blocks 203. When the attraction force is changed, the resilient member 20 deforms resiliently to adjust the electronic devices 200 to coaxially face the wireless charger 100 to have a high charging efficiency.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A wireless charger for charging an electronic device with a secondary coil and a plurality of metal blocks, the wireless charger comprising:
    a holder with a primary coil electromagnetically coupled to the secondary coil of the electronic device, and a plurality of holding coils fixed thereon corresponding to the metal blocks;
    a resilient member deformably sleeved on the holder;
    a sensing module configured for detecting a current value of each holding coil when the wireless charger is power on;
    a storing module configured for storing each current value of the holding coils from the sensing module and predetermining a reference current value for each holding coil;
    a comparing module configured for comparing the current value of the holding coil with the reference current value to determine whether the current value of the holding coil equals the reference current value; and
    an adjusting module configured for changing the current value to the reference current value when the current value is not equal to the reference current value to adjust an angle of the secondary coil of the electronic device relative to the primary coil of the wireless charger, thereby the electronic device can be adjusted to face the wireless charger coaxially when charging.

2. The wireless charger in claim 1, wherein both the holder and the resilient member are cylindrically shaped.

3. The wireless charger in claim 1, wherein the holder comprises a base and a convex platform formed on the base, the base defines a receiving cavity thereof, and the primary coil is fixed on the top surface of the convex platform facing to the resilient member.

4. The wireless charger in claim 3, wherein a step is formed between the convex platform and the base and the step defines a plurality of holes thereon, the holding coils are received in the holes around the convex platform correspondingly.

5. The wireless charger in claim 1, wherein the number of the holding coils is four.

6. The wireless charger in claim 1, wherein the resilient member is made of elastic material.

7. The wireless charger in claim 1, wherein a plurality of resilient threads are formed on the side surface of the resilient member.

8. The wireless charger in claim 1, wherein the resilient member comprises an end surface away from the base, the distance between the end surface and the upper surface of the base is larger than the height of the holding coils relative to the upper surface of the base.

9. The wireless charger in claim 1, wherein the storing module further stores a plurality of product models for a plurality of electronic devices, and each product model corresponds to one of the reference current values.

10. The wireless charger in claim 1, wherein the electronic devices connects to the wireless charger via a data line for transmitting and receiving a data therebetween.

11. The wireless charger in claim 1, wherein if the current value of the holding coil equals the reference current value, the wireless charger continues charging the electronic device, and the comparing module does not signal the adjusting module to initiate a connection to the comparing module.

12. The wireless charger in claim 3, wherein the adjusting module comprises a plurality of adjusting circuits for adjusting the current value of the holding coils to the reference current value, and the adjusting circuits are received in the receiving cavity.

13. The wireless charger in claim 12, wherein each adjusting circuit connects to an alternating current (AC) power supply and comprises an alternating current value/direct current value (A/D) unit and a variable resistance connected in series, the A/D unit is configured for transforming an alternating current value in the holding coils to a direct current value to attract the metal blocks, and the variable resistance is configured for changing the current value of the holding coils by changing the resistance of the adjusting circuit.

14. A charging method for a wireless charger which comprises a holder with a primary coil and a number of holding coils fixed thereon and a resilient member sleeve on the holder to charge an electronic device with a secondary coil and a plurality of metal blocks comprising the steps of:
  detecting the current value of each holding coil when the wireless charger is powered on;
  storing each current value of the holding coils and predetermining a reference current value for each holding coil;
  comparing the current value of the holding coil with the reference current value to determine whether the current value of the holding coil is equal to the reference current value;
  if the current value of the holding coil is not equal to the reference current value, changing the current value to the reference current value, to adjust an angle of the secondary coil of the electronic device relative to the primary coil of the wireless charger, thereby the electronic device can be adjusted to face the wireless charger coaxially to charge; if the current value of the holding coil is equal to the reference current value, continue charging the electronic device.

* * * * *